May 19, 1942.                M. DECALION                2,283,598
                       ILLUMINATING APPARATUS
                       Filed Aug. 2, 1939

Inventor
Maurice Decalion
By Watson, Cole, Grindle & Watson
Attorney

Patented May 19, 1942

2,283,598

UNITED STATES PATENT OFFICE 2,283,598

ILLUMINATING APPARATUS

Maurice Décalion, Paris, France, assignor to Societe pour la Fabrication des Projecteurs Electriques Marchal (Societe Anonyme), Pantin, France, a company of France Application August 2, 1939, Serial No. 288,011
In Luxembourg May 11, 1939

2 Claims. (Cl. 240—41.3)

In some illuminating apparatus, especially headlights for automobile vehicles, which must produce a powerful beam for illuminating distant points, and also a wide beam for illuminating the sides of the road, without substantial variation of illumination on said sides, the whole or a part of the flux emitted by the lamp is collected by a reflector and sent onto a glass provided with prisms or equivalent parts, or onto one or several lenses, which serve to distribute this flux.

The known apparatus of this type require a large output area but, however, their efficiency is rather low.

The object of the present invention is to provide illuminating apparatus and in particular headlights for automobile vehicles which, while being of relatively small size, however supply, both at remote points and at relatively close points, an illumination equivalent and even greater than that obtained with known lights of large diameter.

According to an essential feature of the present invention, these illuminating apparatus include the combination of reflecting means and refracting means, including for instance one or several lenses (especially of the stepped type) or equivalent elements, supplying several beams of different divergences, with a given distribution of the flux in the resulting beam, the refracting means being of a shape corresponding to that of the reflecting means in such manner that the elements of the refracting means are the closer to the images of the source or to the portions of caustics formed by the light rays issuing from the reflector and directed onto said elements as the latter receive a greater flux per unit of area.

The mutual arrangement of the beams is such that the light spots they give on a screen located at a great distance perpendicularly to the axis of the apparatus overlap at least for a great part.

More specifically, it is an object of the invention to provide, in illuminating apparatus, a generally ellipsoidal reflector of which one focus coincides with the light source, in combination with a concentrically stepped lens so constructed and arranged that the respective foci of the lens steps are substantially coincident with the second focus of the ellipsoidal reflector, the focal length of the lens steps increasing progressively from the central to the outer step.

Other features of the present invention will be apparent from the following detailed description of some specific embodiments thereof.

A preferred embodiment of the present invention will be hereinafter described, with reference to the accompanying drawing, given merely by way of example, and in which.

Figure 1:
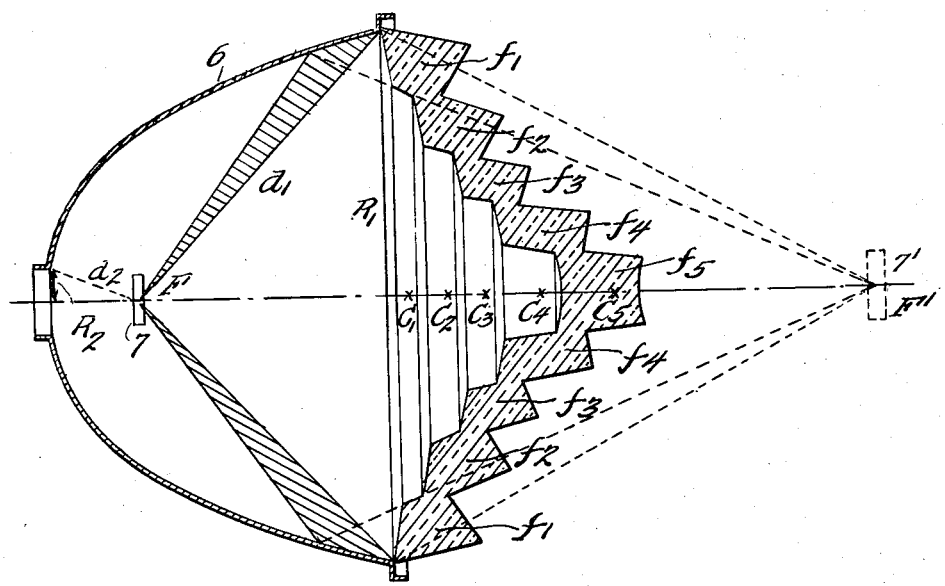
Figure 1 shows an ellipsoidal reflector combined with stepped lens according to the invention.

In order to explain the principle of the invention, I have shown in Figure 1 a reflector 6 cooperating with a source of light 7, said reflector defining a portion of an ellipsoid of revolution and thus having in section by a plane passing through its axis the shape of a portion of an ellipse, the source of light being disposed at one focus of this ellipse.

Associated with the reflector and source is a lens comprising concentric steps $f_1$, $f_2$, $f_3$, $f_4$, $f_5$, these lens steps having different focal lengths represented respectively by $C_1F'$, $C_2F'$, $C_3F'$, $C_4F'$, $C_5F'$, each step acting separately as an annular lens on the portion of the flux that passes therethrough. On a screen remote from the projector one will thus obtain a light spot formed by the superpositioning of the five spots given respectively by the five steps.

Figure 2:
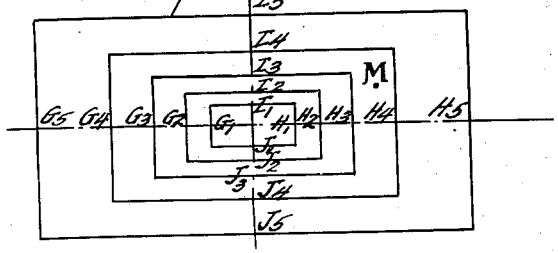
Figure 2 is a diagrammatic illustration of the various light spots which may be obtained on a screen by the construction shown in Figure 1.
Figure 3:
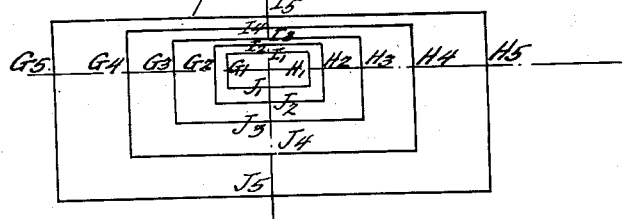
Figure 3 shows a modified arrangement of the light spots.

Thus as shown in Figure 2 or 3, step $f_1$ produces spot $G_1H_1I_1J_1$ having in its central part an illumination $E_1$, step $f_2$ produces spot $G_2H_2I_2J_2$ having in its central part an illumination $E_2$, and so on. As the areas $s_1 s_2 s_3 s_4 s_5$ of the various steps are of decreasing values, respectively, $E_1$ is greater than $E_2$, which in turn is greater than $E_3$, which in turn is greater than $E_4$, which in turn is greater than $E_5$.

The illumination at the center of the screen will be $E$, equal to the sum of $E_1$, $E_2$, $E_3$, $E_4$ and $E_5$. At a point such as M, the illumination will be $E_4+E_5$.

Therefore, it will be understood that, owing to the arrangement according to the invention, it is possible, by giving the lens a general shape combined with the distribution of the flux of the light beam it receives, easily to obtain a final beam in which the flux is distributed in the desired manner, or a distribution approximating very closely this desired distribution, while the whole, or nearly the whole of the apparatus serves to produce the maximum illumination in the beam.

The dimensions of the concentric spots $G_1H_1I_1J_1$, $G_2H_2I_2J_2$, etc. obtained on the screen increase from one to the other for two reasons:

First the focal lengths of steps $f_1$, $f_2$, $f_3$, $f_4$, $f_5$ decrease in the order named.

Secondly, the various images of the filament supplied by the various zones of the reflector, the center of which is at F' and which act as virtual objects for the respective lenses formed by steps $f_1$, $f_2$, $f_3$, $f_4$, $f_5$, are of different sizes, the image corresponding to $f_1$ being of smaller size than that corresponding to $f_2$, and so on, since the portion of reflector 6 which corresponds to $f_1$ is at a greater distance from the source located at F than the portion of the reflector which corresponds to $f_2$, and so on.

The dimensions of the images or luminous spots that are obtained depend essentially upon the dimensions and size of the filament of the lamp that is employed and the relative values of the fluxes received by the respective steps in comparison of the emitting surface of these steps. Therefore it will be possible, according to the present invention, to act upon any of these factors with a view to obtaining a predetermined final distribution in the beam that is produced.

The steps disclosed by Fig. 1 are prisms shaped in such manner as to work under conditions close to those corresponding to the minimum of deviation, which ensures a good efficiency.

It is merely by way of example that I have shown and illustrated a reflector of elliptic shape or giving a convergent beam, combined with a divergent lens and I may depart from this embodiment while remaining within the scope of the invention.

It will be appreciated that in the preferred embodiment of the invention shown in Figure 1, the lens acts on the virtual images which are formed at the second focus of the ellipsoid and there is no obstacle to the positioning of the lens elements as close as it is desired to these virtual images.

Calling $R_1$ and $R_2$ the respective radii of the two curves, generally two circumferences, which limit the useful surface of the reflector (the curve of radius $R_2$ corresponding, as a rule, to the aperture necessary for the lamp carrier or to the line limited on the reflector by the light rays tangent to the rounded part of the bulb, or to any other practical consideration), $d_1$ and $d_2$, the distances of point F (or any other point of the source) to the edge of the reflector, the reflector collects the maximum flux when the following condition is complied with:

$$\left(\frac{d_1}{d_2}\right)^3 = \left(\frac{R_1}{R_2}\right)^2$$

This condition, which, of course, may be complied with only approximately, has been fully explained in my co-pending U. S. patent application Ser. No. 287,396, filed July 29, 1939.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. An illuminating apparatus which comprises in combination, a source of light, a reflector co-operating with said source of light having in section by a plane passing through its axis the shape of a portion of an ellipse, the first focus of which coincides with said source of light, and a lens comprising concentric steps, including a central step and an outer step, associated with said reflector, the respective foci of said steps being in coincidence with the second focus of said ellipse and the focal length of the steps increasing progressively from the central to the outer step.

2. The combination recited in claim 1 in which the concentric steps of the lens are offset.

MAURICE DÉCALION.